United States Patent [19]

Lewis

[11] 4,342,640

[45] Aug. 3, 1982

[54] MAGNETIC SEPARATION OF MINERAL PARTICLES FROM SHALE OIL

[75] Inventor: Robert T. Lewis, Albany, Calif.

[73] Assignee: Chevron Research Company, San Francisco, Calif.

[21] Appl. No.: 210,092

[22] Filed: Nov. 24, 1980

[51] Int. Cl.[3] ...................... C10G 32/02; B01D 35/06; B03C 1/00; B03C 1/30

[52] U.S. Cl. .................................. 208/11 R; 208/177; 208/251 R; 209/8; 209/11; 209/39; 209/40; 209/214; 210/222; 210/695

[58] Field of Search ................ 210/695, 222; 208/177, 208/251 R, 11 R; 209/8, 11, 39, 40, 214, 77

[56] References Cited

U.S. PATENT DOCUMENTS

| | | | |
|---|---|---|---|
| 2,398,725 | 4/1946 | Schutte | 210/695 |
| 2,976,557 | 3/1961 | Shen et al. | 208/10 |
| 3,463,310 | 8/1969 | Ergun et al. | 209/8 |
| 3,725,241 | 4/1973 | Chervenak | 208/10 |
| 3,838,044 | 9/1974 | Hengeli | 210/695 |
| 4,158,620 | 6/1979 | Beck | 208/11 R |
| 4,160,719 | 7/1979 | Pollock | 208/11 R |
| 4,176,042 | 10/1979 | Fahlstrom | 208/11 |
| 4,242,200 | 12/1980 | Duboureji | 210/222 |
| 4,247,398 | 1/1981 | Mohri | 210/222 |

OTHER PUBLICATIONS

Watson, J.H.P., et al., "A Superconducting Magnetic Separator and its Application in Improving Ceramic Raw Materials", 11th Intl. Mineral Processing Congress (1975).

Iammartino, N. R., "New Tasks for Magnetism", Chemical Engineering, Jan. 7, 1974.

Noltimier, H. C. et al., "Thermomagnetic Study of Coal and Associated Roof Shale", "IEEE Transactions on Magnetics, vol. MAG-12, No. 5, Sep. 1976.

Williamson, D. L. et al., "Changes in Iron Minerals During Oil-Shale Retorting", 13th Oil Shale Symposium Proceedings, Colorado School of Mines (1980), pp. 337-350.

de Biasi, R. S. et al., "Magnetic-Resonance Study of the Transformation $\gamma$-$Fe_2O_3$→$\alpha$-$Fe_2O_3$", Physical Review B, vol. 22, No. 1, pp. 304-307 (1980).

Petrakis, L. et al., "High Gradient Magnetic Separation of Fine Particles from Industrial Streams", Proceedings of the Intl., Symposium on Fine Particles Processing, Feb. 24-28, 1980, AIMMPE, pp. 1261-1286.

*Primary Examiner*—Delbert E. Gantz
*Assistant Examiner*—Helane E. Maull
*Attorney, Agent, or Firm*—D. A. Newell; S. R. La Paglia; A. H. Uzzell

[57] ABSTRACT

Oil shale mineral solids are separated from a fluid such as retorted shale oil by heating the mineral solids to a temperature above about 480° C. and above the magnetic transformation temperature of at least a portion of the solids. The temperature of the solids is maintained above 480° C. for no longer than about one minute, and the solids are magnetically separated. High gradient magnetic separation techniques are preferred.

18 Claims, 1 Drawing Figure

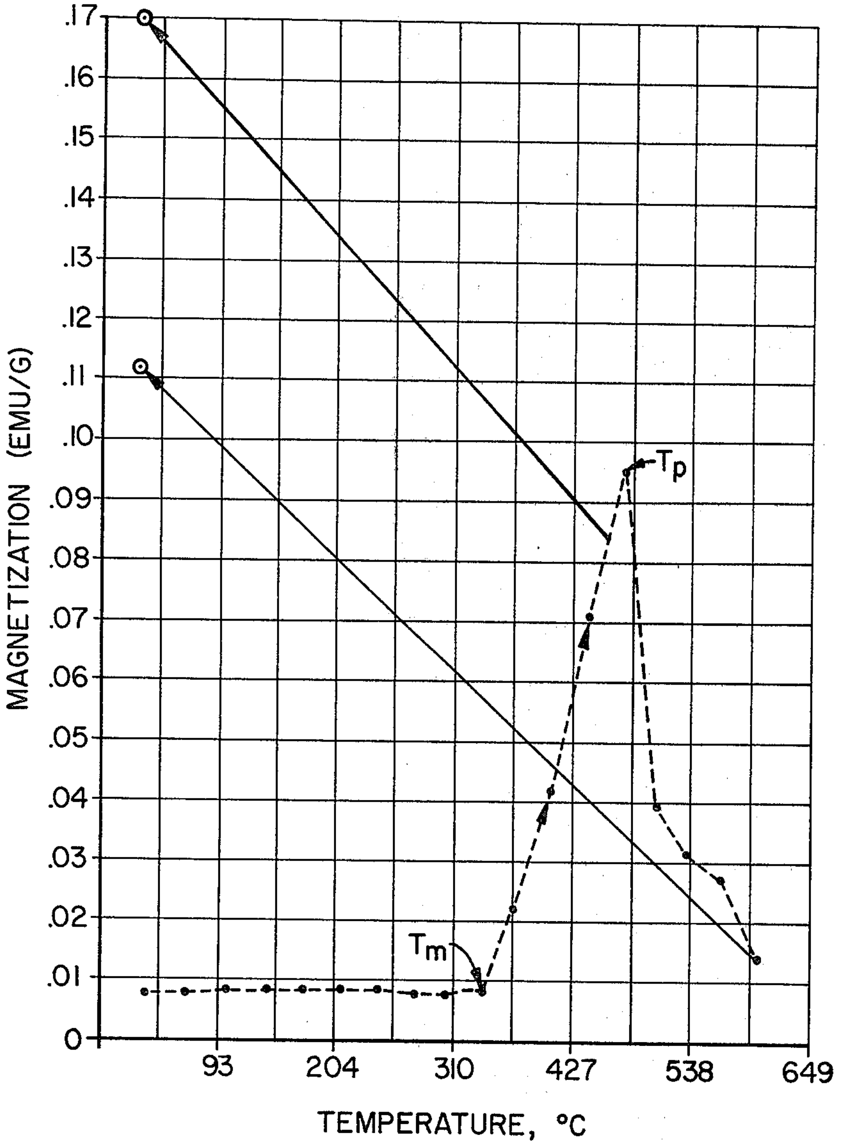
.17
.16
.15
.14
.13
.12
.11
.10
.09
.08
.07
.06
.05
.04
.03
.02
.01
0
MAGNETIZATION (EMU/G)
Tp
Tm
93
204
310
427
538
649
TEMPERATURE, °C

MAGNETIC SEPARATION OF MINERAL PARTICLES FROM SHALE OIL

BACKGROUND OF THE INVENTION

This invention relates to the separation of suspended particles from a fluid by the application of a magnetic field. In particular, the invention involves the use of magnetic separation techniques for the separation of mineral matter from carbonaceous fluids derived from oil shale.

Bituminous sedimentary rocks such as oil shale and alum shales represent a significant reserve of mineral raw materials from which energy can be recovered. These rocks have a predominantly fine grain structure and contain in the interstices between the grains valuable constituents in the form of bituminous residues which may also be of extremely fine grain form. The shales may also contain other inorganic constituents of greater or lesser value in the form of different minerals. The organic constituents of oil shales and alum shales are generally designated kerogen, which is a mixture of stabilized dry and solidified hydrocarbons produced by the sedimentation of organic substances. The predominant inorganic minerals are quartz, dolomite, albite, calcite and ankerite, which contain the metals silicon, aluminum, iron, magnesium, calcium and potassium. Iron minerals present are pyrite, ankerite, siderite, and pyrrhotites. Other metals such as uranium, copper, nickel, cobalt, palladium and molybdenum are also present, for example, as sulfides, silicates, and phosphates.

As used hereinafter, the term "oil shale" includes alum shale and other kerogenous shales. The term "mineral solids" refers to insoluble inorganic and organic particles which are present in carbonaceous fluids derived from oil shale and includes solids which have undergone changes in chemical composition as a result of the retorting or other steps in the shale recovery process. Retorted shale oil is the carbonaceous material (liquid or gaseous) which has been liberated from oil shale by volatilization as a result of a retorting process involving heating the oil shale to a temperature above about 370° C., preferably 450° C.-550° C.

The retorting of oil shale can be carried out underground (in situ) or in above-ground retorts. The retorting can be aided by a stripping gas, such as steam, which is passed through the heated shale to facilitate removal of the retorted carbonaceous product. Retorted shale oil can contain a substantial quantity of mineral solids, including significant quantities of fines smaller than 100 micrometers in diameter. After large particles are removed by conventional filtration, cyclone separators, etc., the carbonaceous solids-lean effluent contains mineral particles predominantly smaller than 10 micrometers in diameter. The mineral solids in the effluent (which can be the feed to a subsequent separation step) can have a particle distribution of about 90 percent by weight of the particles smaller than 10 micrometers in diameter (equivalent sphere diameter) and more than 50, 70, or even 90 percent by weight smaller than 5 micrometers in diameter. In some cases, approximately 20 percent of the particles are smaller than 1 micrometer in diameter. The small size of the shale mineral particles has presented a difficult separations problem to the oil shale industry.

Magnetic processes have been used for recovery of strongly magnetic particles in other industries. See, for example, Watson et al, "A Superconducting Magnetic Separator and its Application in Improving Ceramic Raw Materials", Eleventh International Mineral Processing Congress 1975, University of Cagliari, Italy. Magnetic separation of ferromagnetic and paramagnetic particles from fluids involves exposing a suspension of particles in a fluid to a magnetic field to cause the migration of particles under the influence of the field (due to the field gradient) thereby permitting recovery of a fluid product having a reduced solids concentration. Of recent interest is the technique known as high-gradient magnetic separation (HGMS). HGMS involves the interaction between a filtration element comprised of a ferromagnetic material such as wire filaments and small ferromagnetic or paramagnetic particles in an applied magnetic field, i.e., a magnetic field provided by a source external to the ferromagnetic element. Magnetic field gradients around the filaments are several orders of magnitude higher than in the absence of the ferromagnetic filtration element. The fluid feed stream containing suspended particles is passed in the vicinity of the ferromagnetic element. Those magnetic particles which pass within the capturing distance that the element presents to the fluid stream are caused to migrate to the element and are removed from the stream. In commercial practice the ferromagnetic element is in the form of a steel mesh and the external magnetic field is generally applied by an electromagnet. Superconducting electromagnets and permanent magnets have also been proposed for this application. An example of a HGMS system suitable for use according to this invention is described in the article "New Tasks For Magnetism", Chemical Engineering, Jan. 7, 1974, pp. 50-52, which is incorporated herein by reference.

The applicability of magnetic separation techniques for removal of solids is dependent on a number of complex phenomena. Though a number of transition metals can be ferromagnetic or paramagnetic, the magnetization of particles containing the metals is strongly related to the chemical and morphological form of the metal. When mineral solids are to be separated, the distribution of the magnetic material among the particles is a limiting factor to the separability. For example when magnetic separation is applied to a flowing fluid, the magnetic force must overcome both gravitational forces as well as fluid drag forces. The resultant force, then, is related to the size and density of the particles relative to the amount of magnetic material present in each particle. If sufficient magnetic material is not present in most of the individual particles, poor separation will result regardless of the total amount of magnetic material present.

Much effort has been directed toward the study of magnetic separation of solids from coal liquefaction products. See, for example, "Magnetic Separation of Mineral Matter from Coal Liquids", EPRI AF-508 (Aug. 1977) and EPRI AF-875 (Nov. 1978) available from the Electric Power Research Institute, 3412 Hillview Avenue, Palo Alto, California 94304. It is reported in EPRI AF-508, Section 365-1, page 4.1, that under proper operating conditions, magnetic separation could remove about 99 percent inorganic sulfur and about 40 percent mineral ash from coal liquids at optimum temperature. Other applications of magnetic separation to coal-derived liquids are reported in U.S. Pat. No. 3,725,241, issued Apr. 3, 1973 to Chervenak for "Solids Removal From Hydrogenated Coal Liquids", and U.S. Pat. No. 3,976,557, issued Aug. 24, 1976 to Shen et al for "Pretreatment of Coal-Derived Liquid to Improve Magnetic Separation of Solids" and the background references identified therein.

The application of magnetic separation to coal-derived liquids has been motivated by the large amount of iron present in coal ash. The mineral matter present in oil shales, however, is not rich in iron. A study of magnetic properties of shales was reported by Noltimer et al., in "Thermomagnetic Study of Coal and Associated Roof Shale", IEEE Transaction on Magnetics, Vol. MAG-12, No. 5, September 1976, pages 528–531.

SUMMARY OF THE INVENTION

It is an object of this invention to provide a magnetic process for the separation of solids from a carbonaceous oil shale product. It is a further object to provide such a process which is compatible with existing oil shale processing schemes. These and other objects are provided according to this invention in a process for separating oil shale mineral solids from a fluid feed comprising the steps of:

(a) heating said mineral solids to a temperature above 480° C. and above the magnetic transformation temperature of at least a portion of said mineral solids;

(b) maintaining the temperature of said mineral solids above 480° C. for no more than about one minute;

(c) thereafter exposing said feed to a magnetic field to cause the migration of mineral solids under the influence of said magnetic field to concentrate the solids and provide a fluid product having a reduced solids concentration.

Preferably, the temperature of said mineral solids is maintained above 480° C. for no more than about 10 seconds. In combination with a shale oil retorting process this invention comprises a process for separating oil shale mineral solids from retorted shale oil comprising the steps of:

(a) heating fresh oil shale particles in a retort to a retorting temperature above about 480° C. to drive off hydrocarbonaceous shale oil from said shale particles;

(b) removing retorted shale oil containing mineral solids from said retort;

(c) maintaining the temperature of said retorted shale oil containing mineral solids above 480° C. for no longer than about one minute; and (d) thereafter exposing said retorted shale oil containing mineral solids to a magnetic field to cause the migration of mineral solids under the influence of said magnetic feed to concentrate the solids and provide a retorted shale oil product having a reduced solids concentration.

BRIEF DESCRIPTION OF THE DRAWING

The single FIGURE of drawing is a graph depicting the magnetization of raw oil shale as related to temperature.

DETAILED DESCRIPTION OF THE INVENTION

It has been found according to this invention that insoluble mineral matter present in oil shale undergoes a transformation to a highly magnetic species upon heating. The temperature which this transformation begins to occur with increasing temperature is termed the magnetic transformation temperature, $T_m$. As the shale minerals are heated to a temperature at or above $T_m$, the magnetization increases rapidly to a peak magnetization value, $T_p$. On heating above $T_p$, the magnetization decreases, eventually reaching negligible values at the Curie temperature for the magnetic species.

The mechanism of the magnetic transformations are not completely understood; however, the magnetic transformation temperature has been found to be dependent on the composition of the shale. The values for $T_m$ and $T_p$ for any oil shale or oil shale mineral sample can be determined by measuring the magnetization of the shale at various temperatures as described herein.

The large increase in magnetization which occurs upon heating at or above $T_m$ permits the efficient separation of oil shale mineral solids from fluids such as retorted oil shale. All that is necessary is that the mineral solids be heated to a temperature above the magnetic transformation temperature of at least a portion of the mineral solids and thereafter magnetically separate mineral solids from fluid feed. The magnetic separation can be performed by any process which relies upon particles' magnetization to aid in the separation. Such processes typically involve exposing the feed to a magnetic field to cause the migration of mineral solids (relative to the fluid) under the influence of the field gradient thereby concentrating the solids and providing fluid product having a reduced solids concentration.

The step of heating the minerals can be performed preferably at 350° C.–750° C. before, during, or after release of kerogenous material from the oil shale. The heating step is conveniently carried out during a retorting or extraction process for recovering kerogenous material from oil shale. Once the mineral solids have been heated to above the magnetic transformation temperature, the magnetic separation can be carried out at any convenient temperature. When the fluid feed is retorted liquid shale oil, it is preferred that the magnetic separation step be conducted at a temperature no higher than about 320° C. and preferably below 290° C. to prevent coking of the shale oil. Preferably, the mineral solids are maintained for no longer than one minute, and more preferably no longer than 10 seconds, above about 480° C. because it is believed that a chemical decomposition of the highly magnetic species occurs rapidly above about 480° C.

In other shale oil recovery processes such as solvent extraction processes where heating above $T_m$ does not necessarily occur, the mineral solids can be heated by heating the shale before extraction or by heating the extracted shale oil feed to the separation process in a separate step.

It is believed that water plays a role in the magnetic transformation of the shale minerals. Certain components, such as pyrites, are thought to interact with water present in other mineral components at temperatures of $T_m$ or above to form more magnetic species. It is preferred, therefore, that the shale mineral solids be contacted with externally supplied water vapor during the heating step. This externally supplied water vapor, for example, can be a steam stripping gas used in a retorting process to facilitate the removal of retorted shale oil. Contact with water vapor at a temperature at or above the magnetic transformation temperature of at least a portion of the mineral solids can occur elsewhere in the process if desired.

It has also been found that when shale mineral particles are heated to high temperatures in a combustor wherein carbonaceous material is combusted in the presence of oxygen, an additional increase and the magnetization of the shale occurs. Consequently, when at least a portion of the oil shale mineral solids are heated to about 600° C.–750° C. in a combustor for residual, unretorted carbonaceous shale oil material, an increase in the magnetic separability of the mineral solids can occur. It is believed that this additional enhancement in magnetization is caused by decomposition of carbonates to magnetite, $Fe_3O_4$. Formation of magnetite rather than $Fe_2O_3$ is thought to be a result of limited access to oxygen in the high temperature combustion zone.

The efficiency for the removal of mineral solids from fluids is dependent on several factors including the magnetic field strength, the velocity of the fluid stream, the viscosity of the fluid, and whether the fluid is in the gaseous or the liquid state. A solids removal efficiency greater than 50, 70, 80 or 90% by weight can be achieved in a magnetic separation process, even in a single magnetic separation stage. Of course, a plurality of magnetic separation stages, e.g. in series, can be used according to this invention.

It has been found that magnetic separation efficiency is not strongly related to the size of the particles; that is smaller mineral particles, e.g., those less than about 5 or even less than about 1 micrometer in diameter are removed magnetically with about the same efficiency at low flow rates as are larger particles. This makes magnetic separation particularly useful as a secondary or subsequent solids separation process following preliminary separation of mineral solids by processes having particle size as a separation parameter, i.e., processes whose separation efficiency is strongly influenced by particle size. Examples of such preliminary separation processes are non-magnetic filtration, centrifugation, hydrocloning, gravity settling, etc. When used in combination with such preliminary separation techniques, the feed to the magnetic separation stage or stages is the solids-lean effluent stream of the preliminary separation process, which contains predominantly small particles. The magnetic separation techniques of this invention can achieve 50 weight percent and even 90 weight percent or higher separation efficiency in a single stage, when about 90% by weight of the mineral particles in the fluid are smaller than 10 micrometers in diameter, even when more than 50, 60 or 70% smaller than 5 micrometers in diameter.

The high separation efficiency obtainable according to this invention is surprising in view of the fact that the oil shale minerals typically contain less than 5 percent or even less than 2 percent by weight total iron. In view of this small amount of total iron present, it is particularly surprising that the iron is distributed in such a manner that even very small mineral particles can be efficiently separated magnetically.

It is believed that iron which is present as ferromagnetic or ferrimagnetic species is primarily responsible for the high magnetic separability of the shale mineral solids. Iron present in paramagnetic forms at the 2–5% levels typical of oil shale minerals would be too weakly magnetic for efficient separation of the particles.

The fluid from which mineral solids are separated can be either in the liquid or gaseous state. The preferred technique for recovering carbonaceous fluids is above-ground retorting in which raw shale is heated to a temperature above about 350° C., preferably 450° C.–550° C., and contacted with the stripping gas, preferably steam. The effluent from the retort contains stripping gas, solids and carbonaceous gases liberated from the shale (i.e., retorted shale oil). Such a technique is more fully described in U.S. Pat. No. 4,199,432 entitled: "Staged Turbulent Bed Retorting Process" which is incorporated herein in its entirety by reference. The effluent product stream leaves the staged turbulent bed retort as an overhead gaseous stream at a temperature in the range of 430° C.–550° C., and contains very fine particles due to rapid heating of finely divided shale particles. The shale particles from which essentially all the volatilizable hydrocarbons have been removed (retorted oil shale) may still contain residual carbon and are cycled to a combustor to provide process heat. Spent shale, or shale from which a substantial portion of residual carbon has been removed by combustion, is cycled to the retort as heat carrier particles. These spent shale particles constitute a portion of shale mineral particles to be separated from the retorted shale oil product.

Any magnetic separation technique can be used which involves the migration of mineral solids (relative to the fluid) under the influence of a magnetic field to concentrate the solids, so that the portion of the liquid from which solids migrate can be recovered as a solids lean product. Conventional magnetic separation techniques can be used such as those described in Kirk-Othmer Encyclopedia of Chemical Technology, Vol. 12, John Wiley & Sons, New York (1967), pp. 782–800, which is incorporated herein by reference.

It is thought that some solids separation can be achieved in this invention even in the absence of an applied magnetic field, because at least some of the iron is believed to be present in particles or particle regions sufficiently small as to constitute a single magnetic domain. Such particles would be attracted to a ferromagnetic material as a result of their own magnetic fields.

When the process of this invention is employed to separate mineral solids from a fluid comprising retorted shale oil, separation can be carried out when the fluid is either in the liquid or gaseous state. Magnetic separation from a gaseous retorted shale oil feed should be performed at a temperature above the boiling point of the shale and below about 600° C., or preferably between 450° C. and 550° C. The boiling point of retorted shale oil in atmospheric pressure is about 450° C. Magnetic separation from the gas phase can be accomplished by contacting the particle-laden gas stream with a ferromagnetic element disposed within an applied magnetic field to cause the attraction and collection of magnetic particles from the fluid stream. Collected particles can be recovered by periodically heating the ferromagnetic element to above the Curie temperature of either the particles or the element, and disengaging the particles from the element. The heating and disengaging can be accomplished simultaneously by passing AC current through the element which causes heating and vibration of the element within the field.

When the separation is formed from retorted shale oil in the liquid phase, the separation step should be performed at temperature below the coking temperature of the liquid shale oil, generally below about 320° C., preferably at 120° C.–290° C. When the shale oil is to be condensed prior to separation, it is preferred that the shale minerals experience temperatures above about 480° C. for no more than about 1 minute, more preferably no longer than 10 seconds to avoid rapid reduction in magnetization. Rapid cooling to below 480° C. can be conveniently achieved in conventional wet plate condensors wherein the gaseous retorted shale oil is rapidly condensed by contacting with liquid phase shale oil or other miscible liquids. The following examples illustrate the effectiveness of magnetic separation of oil shale mineral solids from fluids.

EXAMPLE 1

A filter feed was prepared from equal portions of a whole retorted shale oil product and toluene, containing 1 gram of shale mineral fines in 100 milliliters of feed. The filter feed was passed at room temperature through a laboratory scale magnetic filter comprising a steel wool mesh disposed in a magnetic field provided by an electromagnet. Filtration experiments were carried out at flow rates 0.15 and 0.015 centimeters per second. The reduction in magnetization of the fines after filtering and the weight percent reduction in fines were measured, and the results are shown in Table 1. A substantial amount of the particles were removed at zero field strength by entrapment in the mesh; however, the effect of the magnetic field is clearly evident, especially at high flow velocity.

TABLE 1

| Flow Rate cm/sec | Field Strength (kOe) | % Reduction in Magnetization | % Reduction in Ash |
|---|---|---|---|
| 0.15 | 0 | 23.9 | 14.3 |
| 0.15 | 10 | 93.3 | 98.2 |
| 0.015 | 0 | 85.0 | 85.7 |
| 0.015 | 10 | 95.5 | 98.3 |

EXAMPLE 2

A filter feed was prepared by dispersing 1 gram of fines previously obtained by conventional separation techniques from a pilot plant oil shale retort oil product in 100 milliliters of toluene, and 100 milliliters of filtered whole retorted shale oil containing less than 0.02 percent solids was added. The toluene was evaporated off leaving 100 milliliters retort oil containing 1 percent fines. The results of high gradient magnetic filtration tests performed as in Example 1 are depicted in Table 2 as runs A-H. Again, a substantial fraction of particles was removed with no applied magnetic field. At lower flow rates, more than 60 weight percent of the ash particles were recovered in a single magnetic filtration step.

TABLE 2

| Run | Flow Rate (cm/sec) | Field Strength kOe | % Reduction in Magnetization | % Reduction in Ash |
|---|---|---|---|---|
| A | 0.040 | 0 | 42.1 | 26.4 |
| B | 0.037 | 5 | 89.5 | 62.5 |
| C | 0.079 | 10 | ~100 | 72.2 |
| D | 0.013 | 0 | 54.4 | 9.1 |
| E | 0.011 | 5 | 96.5 | 79.4 |
| F | 0.021 | 10 | ~100 | 76.5 |
| G | 0.21 | 2 | 75.4 | 25.2 |
| H | 0.16 | 5 | 91.2 | 41.4 |
| I | 0.032 | 2 | 71.7 | 61.7 |
| J | 0.37 | 5 | 94.5 | 61.7 |

EXAMPLE 3

Unfiltered retort oil obtained from a pilot plant run using Green River Formation shale from the Piceance Basin, Colorado, Parachute Creek Member, and containing about 30 percent fines, was used as a feed to a laboratory scale HGMS apparatus. Another filter feed was prepared by diluting this unfiltered oil with toluene in a 1:1 ratio. The results are shown in Table 2 as runs I and J, respectively. Interestingly, the feeds contained approximately 10 and 5 cubic centimeters of fines so the volume of the ferromagnetic element, (2 cubic centimeters of steel wool) was exceeded severalfold.

EXAMPLE 4

19.7 grams of previously separated retorted shale oil fines was dispersed in 100 milliliters of toluene. This suspension was magnetically filtered in three passes with a magnetic field strength of 6 kOe and a velocity of 0.4 centimeters per second in a filter containing 22 grams of fine grade 430 steel wool. After each pass the toluene was evaporated, the residue was weighed and its magnetization was measured. The residue was then redispersed in 100 milliliters of toluene for the next pass. Clean steel wool was used each time. The material retained on the wool after each pass was removed by backflushing for particle size analysis. The results are depicted in Table 3. The median diameter of retained particles represents the median particle size of the particles removed by backflushing. Analysis of particle size distributions on the material removed after each pass indicated that at the test conditions the magnetic filtration was not classifying the material by size. The particles, therefore, were preferentially removed according to magnetization but not according to particle size, thereby showing the high efficiency of magnetic separation when used after particle separation means which preferentially remove larger particles.

TABLE 3

| Pass Number | % Solids removed | Magnetization (emu/g) | Median Diameter of Retained Particles (micrometers) |
|---|---|---|---|
| Starting Material | | 0.120 | 2.5 |
| 1 | 70.4 | 0.0166 | 2.4 |
| 2 | 88.4 | 0.0079 | 2.3 |
| 3 | 94.9 | 0.0037 | 2.1 |

EXAMPLE 5

Fresh oil shale from Green River Formation and having a grade of 38 gallons per ton was heated in helium and its magnetization was measured at various temperature. The figure depicts the magnetization in emu per gram as a function of temperature. As the shale was heated from room temperature, the magnetization was fairly constant until the magnetic transformation temperature, $T_m$, was reached at about 340° C., at which a sharp rise in magnetization occurs with further heating. The magnetic transformation temperature for shale mineral solids is typically in the range of 300° C.–475° C. It is believed that this transformation involves the conversion of iron sulfide to gamma-$Fe_2O_3$. Upon further heating, the magnetization reaches a peak value at temperature $T_p$, about 480° C. Heating above $T_p$ results in a decline in magnetization. The conversion of gamma-$Fe_2O_3$ to alpha-$Fe_2O_3$ generally proceeds fairly rapidly above about 480° C., so the heated solids should be maintained above 480° C. for as little time as possible, e.g. no longer than about 1 minute, preferably no longer than 10, or even 5 seconds. Upon heating to above about 650° C., the magnetization becomes too small for efficient separation at that temperature. Two of the samples were cooled to room temperature in flowing helium at roughly 300° C. per minute, and their magnetization measured. The sample heated to above about 590° C. increased magnetization to about 0.11 emu/g after rapid cooling. A sample heated to about 460° C., slightly lower than $T_p$, increased in magnetization to about 0.17 emu/g upon rapid cooling. A sample of 28 gallon per ton shale which had been heated to about 590° C. and slowly cooled to room temperature had a magnetization of only about 0.06 emu/g, while a sample of the same heated material which was rapidly cooled had a magnetization of 0.17 emu/g at room temperature.

EXAMPLE 6

Samples of fines were taken from a fluidized bed shale retort pilot plant. One unfiltered oil sample contained material that had been retorted and quenched. Total heating and cooling time was only a few seconds. One solids sample contained only shale material that had been first retorted and then passed through a fluidized bed combustor at about 650° C. where residual carbonaceous material had been burned. The total combustor residence time was uncertain. Two other samples were obtained from a pilot plant run wherein solids from the combustor were recycled to the retort for a total residence time of a few seconds, so the retorted oil contained a mixture of retort and combustor fines. The results are shown in Table 4. The combustor fines had the highest magnetization, the retort fines had the lowest and the fines containing recycle combustor fines had intermediate magnetization. Table 4 also shows magnetic filtering data obtained with a laboratory scale HGMS apparatus filtering 1% fines in toluene at a field strength of 11.4 kOe and a fluid velocity of 0.5 cm/sec.

TABLE 4

| Sample | Magnetization emu/g | % Filtered (by Ash) |
|---|---|---|
| Retort Fines only | 0.12 | 98.4 |
| Combustor Fines only | 0.31 | 99.6 |
| Recycle Solids Fines | 0.17 | 99.9 |
| Recycle Solids Fines | 0.19 | 97.2 |

The following specific embodiment is presented for illustrative purposes only, the scope of the invention being limited only by claims.

SPECIFIC EMBODIMENT

Raw oil shale obtained from the Green River Formation and having a particle size of $-2\frac{1}{2}$ Tyler mesh is fed with hot spent shale particles (as a heat transfer medium) to a staged turbulent bed retort as described in the aforementioned U.S. Pat. No. 4,199,432. The mass flow rate of raw shale through the retort should be maintained between 60 and 360 $k_g/hr\text{-}m^2$. The temperature at the top of the retort is preferably maintained at 430° C.–550° C. A stripping gas, such as recycle product gas, hydrogen, or any inert gas, and preferably containing steam is introduced into the lower section of the retort. The stripping gas should be essentially free of molecular oxygen to prevent combustion within the retort. The stripping gas has a velocity of 0.3–1.5 m/sec and functions to fluidize the shale and to strip hydrocarbonaceous vapors from the retorted shale. The product effluent stream containing hydrocarbonaceous vapors, stripping gas, and entrained fines including shale mineral matter is passed to a separation system for removal of fines and separation of normally liquid components and normally gaseous components. The gaseous product stream containing fines from the retort is passed through one or more preliminary separation steps such as cyclone separators and/or electrostatic precipitators in series. The solids lean effluent from the preliminary separation stages contains particles which are at least about 90% by weight smaller than 10 micrometers in diameter, and is passed in the gas phase through one or more stages of high gradient magnetic filters. The magnetic filters remove more than 50% and preferably more than 90% of the mineral solids present in the effluent from the preliminary separation stages, preferably at a filtration temperature of 450° C.–570° C. A high gradient magnetic separator for gas stream is described in U.S. Environmental Protection Agency Report EPA-600/7-80-037 (March, 1980) available from the National Technical Information Service, Springfield, Va. 22161, which is incorporated herein by reference. The gas phase having reduced solids content is then cooled by conventional heat exchange and separated into its normally liquid and gaseous components. Alternately, the effluent is condensed either before or after conventional separation, and prior to magnetic separation. The liquid phase magnetic separation is conveniently carried out at room temperature to 320° C., preferably 120° C.–300° C. The cooling of the effluent to below about 480° C. should be carried out rapidly, e.g., within about one minute or less.

The process of this invention can be performed in numerous embodiments which involve the removal of mineral particles after heating from shale oil-derived fluids under the influence of magnetic fields. Such embodiments are contemplated as equivalents of those described and illustrated herein.

What is claimed is:

1. A process for separating oil shale mineral solids from a fluid feed comprising the steps of:

(a) heating said mineral solids to a temperature above about 480° C. and above the magnetic transformation temperature of at least a portion of said mineral solids;

(b) maintaining the temperature of said mineral solids above 480° C. for no longer than about one minute; and (c) thereafter exposing said feed to a magnetic field to cause the migration of mineral solids under the influence of said magnetic field to concentrate the solids and provide a fluid product having a reduced solids concentration.

2. A process according to claim 1 wherein said fluid feed is exposed to a high gradient magnetic field provided by a ferromagnetic material disposed within an applied magnetic field.

3. A process according to claim 1 wherein prior to exposing said feed to said magnetic field, said mineral solids are contacted with externally supplied water vapor at a temperature at or above said magnetic transformation temperature.

4. A process according to claim 1, 2, or 3 wherein said fluid feed comprises retorted shale oil.

5. The process according to claim 1, 2, or 3 wherein said heating step is performed at 350° C.–750° C.

6. A process according to claim 1, 2, or 3 wherein prior to exposing said feed to said magnetic field, at least a portion of said oil shale mineral solids are heated to 600° C.–750° C. in a combustor for residual carbonaceous oil shale material.

7. A process according to claim 1, 2, or 3 wherein said magnetic transformation temperature is within the range of about 300° C.–475° C.

8. A process according to claim 1, 2, or 3 wherein said fluid feed comprises retorted shale oil in the liquid state and said magnetic separation step is performed by exposing said fluid feed containing oil shale mineral solids to said magnetic field at a temperature of 120° C.–290° C.

9. A process according to claim 1, 2, or 3 wherein said mineral solids are maintained above 480° C. for no longer than 10 seconds.

10. A process according to claim 1, 2 or 3 wherein said feed is exposed to a plurality of magnetic separation stages in series.

11. A process according to claim 1, 2, or 3 wherein at least about 90 weight percent of the mineral solids in said feed are smaller than 10 micrometers in diameter.

12. A process according to claim 11 wherein at least about 50 weight percent of the mineral solids are separated from said feed.

13. A process according to claim 11 wherein at least about 90 weight percent of the mineral solids are separated from said feed.

14. A process according to claim 11 wherein at least about 50 weight percent of the mineral solids are separated from said feed in a single magnetic separation stage.

15. A process according to claim 11 wherein at least about 90 weight percent of the mineral solids are separated from said feed in a single separation stage.

16. A process according to claim 12 wherein the mineral solids in said feed contain no more than about 5 weight percent iron.

17. A process for separating oil shale mineral solids from retorted shale oil comprising the steps of:

(a) heating fresh oil shale particles in a retort to a retorting temperature above about 480° C. to drive off hydrocarbonaceous shale oil from said raw shale particles;

(b) removing retorted shale oil containing mineral solids from said retort;

(c) maintaining the temperature of said retorted shale oil containing mineral solids above 480° C. for no longer than about one minute; and (d) thereafter exposing said retorted shale oil containing mineral solids to a magnetic field to cause the migration of mineral solids under the influence of said magnetic field to concentrate the solids and provide a retorted shale oil product having a reduced solids concentration.

18. A process according to claim 17 wherein said retorted shale oil containing mineral solids is maintained above 480° C. for no longer than 10 seconds.

* * * * *